United States Patent
Macconnell et al.

(10) Patent No.: US 10,936,275 B2
(45) Date of Patent: Mar. 2, 2021

(54) ASYNCHRONOUS COMMUNICATIONS IN MIXED-REALITY

(71) Applicant: Microsoft Technology Licensing, LLC, Redmond, WA (US)

(72) Inventors: Duncan Og Macconnell, Seattle, WA (US); Ilya Yurievich Rostovtsev, Seattle, WA (US); Stephen Earl Fenton, Redmond, WA (US); Bill Chau, Sammamish, WA (US); Kenneth Douglas Smith, Renton, WA (US); Kelly Jean Graham, Seattle, WA (US); Ines Khelifi, Redmond, WA (US); Thomas Charles Butcher, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 22 days.

(21) Appl. No.: 16/234,045

(22) Filed: Dec. 27, 2018

(65) Prior Publication Data

US 2020/0210138 A1 Jul. 2, 2020

(51) Int. Cl.
G06F 3/048 (2013.01)
G06F 3/16 (2006.01)
G06F 3/0481 (2013.01)
G06F 3/0482 (2013.01)

(52) U.S. Cl.
CPC .............. *G06F 3/16* (2013.01); *G06F 3/0482* (2013.01); *G06F 3/04815* (2013.01)

(58) Field of Classification Search
CPC .......... G06F 3/011; G06F 3/013; G06F 3/016; G06F 3/167; G06F 3/0482; G06F 40/169; G06F 3/012; G06F 3/017; G06F 3/04842
See application file for complete search history.

(56) References Cited

U.S. PATENT DOCUMENTS

2016/0291824 A1* 10/2016 Grossman ............. H04L 51/066
2016/0295038 A1* 10/2016 Rao ..................... G06F 3/005
2018/0121470 A1* 5/2018 Grossman ........... G06F 16/5866

FOREIGN PATENT DOCUMENTS

WO 2018226448 A1 12/2018

OTHER PUBLICATIONS

Harmon et al., "The Virtual Annotation System", In Proceedings of the IEEE Virtual Reality Annual International Symposium, Mar. 30, 1996, pp. 239-245.
"International Search Report and Written Opinion Issued in PCT Application No. PCT/US19/067708", dated Jul. 5, 2020, 8 Pages.

* cited by examiner

*Primary Examiner* — Claudia Dragoescu
(74) *Attorney, Agent, or Firm* — Buckley, Maschoff & Talwalkar LLC

(57) ABSTRACT

A system and method include presentation of a plurality of virtual objects to a first user, reception, from the first user, of a command to associate a voice annotation with one of the plurality of virtual objects, reception of audio signals of a first voice annotation from the first user, and storage the received audio signals in association with metadata indicating the first user and the one of the plurality of virtual objects.

13 Claims, 10 Drawing Sheets

800

| ID | Context | User | Object | Target | Reply IDs | Previous ID | Create Time |
|---|---|---|---|---|---|---|---|
|  |  |  |  |  |  |  |  |
|  |  |  |  |  |  |  |  |
|  |  |  |  |  |  |  |  |
|  |  |  |  |  |  |  |  |

*FIG. 8*

ASYNCHRONOUS COMMUNICATIONS IN MIXED-REALITY

BACKGROUND

A conventional mixed-reality system is capable of presenting a mixed-reality environment to a user. A mixed-reality environment may include any combination of real and artificial sensory stimuli. For example, a mixed-reality headset may allow a user to see portions of her actual environment while simultaneously displaying images of virtual objects such that the virtual objects appear to be present within the actual environment. The headset may also deliver sounds to the user which are not present within the actual environment.

Some mixed-reality applications allow two or more users to "occupy" a same shared mixed-reality environment. While present within the shared environment, the users may communicate with one another via text or audio (i.e., speech). Examples of such applications include videoconferencing applications and gaming applications.

Mixed-reality systems do not support communication between users who are not simultaneously present in a given mixed-reality environment. Systems are therefore desired to provide efficient asynchronous communication between users within a shared mixed-reality environment.

BRIEF DESCRIPTION OF THE DRAWINGS

FIG. 8 is a tabular representation of voice annotation metadata according to some embodiments;

DETAILED DESCRIPTION

The following description is provided to enable any person in the art to make and use the described embodiments. Various modifications, however, will remain apparent to those in the art.

Embodiments described herein provide a technical solution to the technical problem of asynchronous communication with mixed-reality environments. According to some embodiments, voice annotations may be generated by a user and accessed by other users within a mixed-reality environment. A voice annotation may be associated with a virtual object, one or more target users, and/or with one or more other voice annotations.

Figure 1:
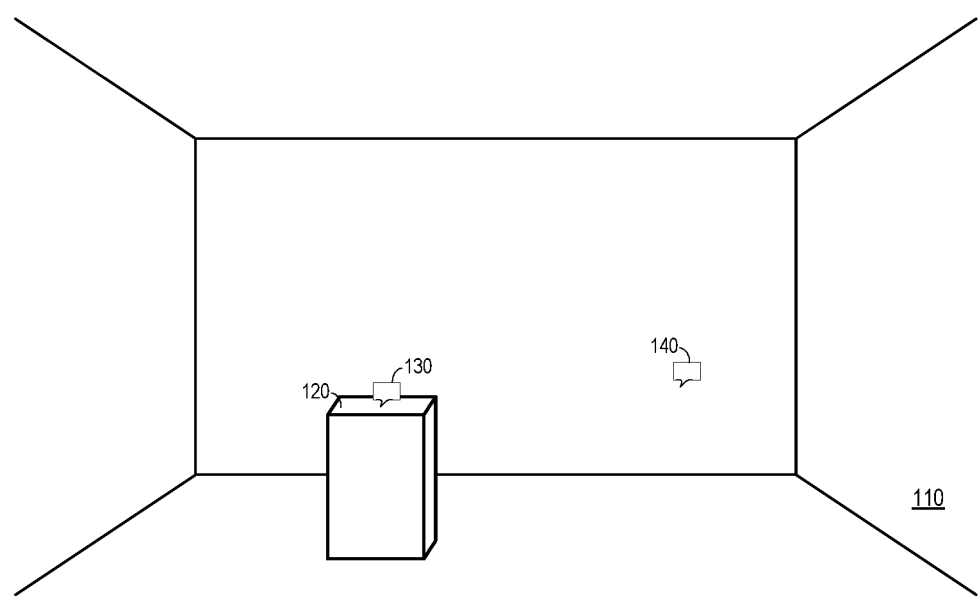
FIG. 1 depicts a mixed-reality environment including voice annotation indicators according to some embodiments.

As an initial introduction to some embodiments, FIG. 1 illustrates mixed-reality environment 100 presented to a user. The "room" of environment 100 includes a virtual floor, ceiling and walls presented on a hardware display. Also presented are virtual object 120 (e.g., a server rack) and virtual annotation indicators 130 and 140. The hardware display may comprise a computer monitor, a head-mounted display, a projector, etc.

In the present example, none of the objects of environment 110 are actual physical objects. In some embodiments, one or more of the objects may be actual objects. For example, the floor, ceiling and walls may be the floor, ceiling and walls of the room in which the user is located, with object 120 and indicators 130 and 140 being overlaid or embedded within the user's field of view as shown. Object 120 and indicators 130 and 140 may comprise two-dimensional, three-dimensional, holographic, and/or any other type of presentable images that are or become known.

A computing system may execute a computing application to present mixed-reality environment 100 to the user. In some examples, the computing application facilitates generation of three-dimensional layouts. In other examples, the computing application is a multiplayer gaming application. Embodiments are not limited to any specific type of application.

Indicators 130 and 140 represent respective voice annotations which have been generated and associated with environment 110. Indicator 130 represents a voice annotation which is further associated with virtual object 130, while indicator 140 represents a voice annotation which is not associated with any particular object. As will be described below, the annotations may be associated with the current user viewing environment 110.

Figure 2A:
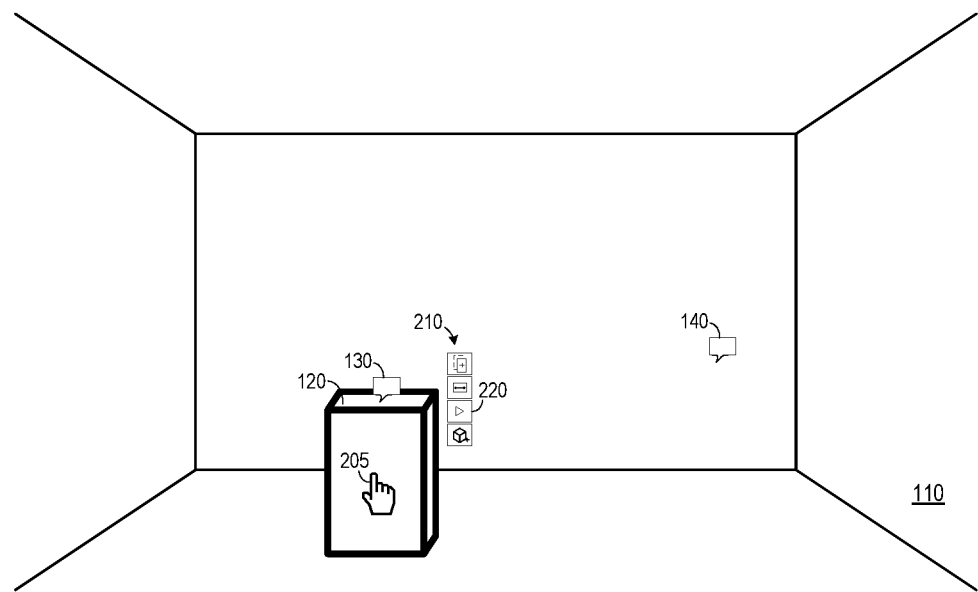
FIG. 2A depicts interaction with a mixed-reality environment to play a voice annotation according to some embodiments.

FIG. 2A depicts interaction with mixed-reality environment 100 to play a voice annotation according to some embodiments. As shown, the user has used an input device (e.g., a hand, a mixed-reality controller) to manipulate cursor 205 to select object 120. As a result, context menu 210 is displayed. Because object 120 is associated with a voice annotation (as represented by indicator 130), context menu 210 includes play control 220. It will be assumed that play control 220 is then selected to initiate playback of the associated voice annotation.

Figure 2B:
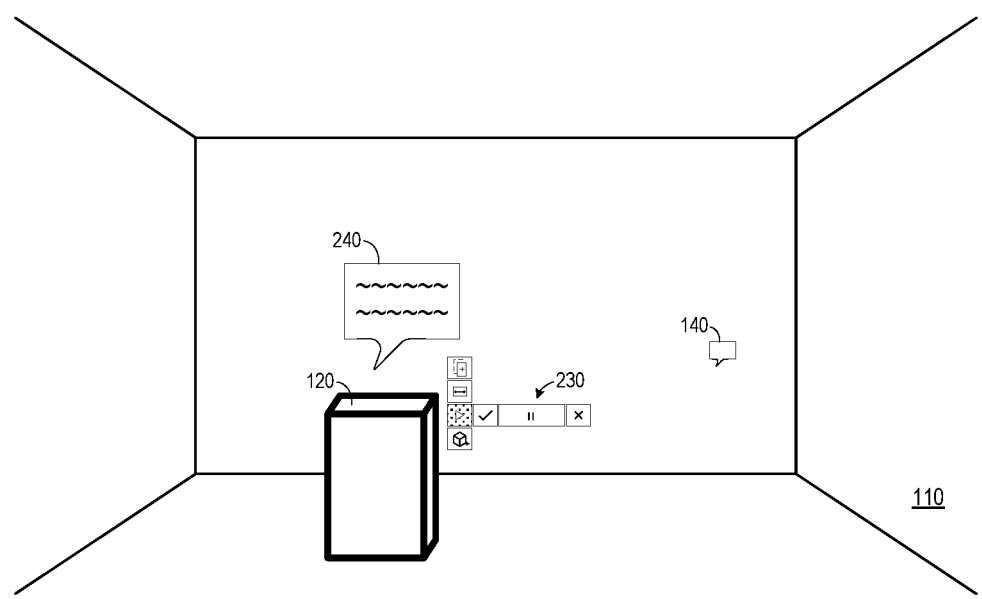
FIG. 2B depicts playback of a voice annotation in a mixed-reality environment according to some embodiments.

FIG. 2B illustrates playback of the voice annotation according to some embodiments. The voice annotation is played via a loudspeaker system so as to be aurally perceptible to the user. According to some embodiments, the voice annotation is played so as to appear to be emanating from the virtual object with which it is associated. During playback, play control 220 expands to play control bar 230 to allow control (e.g., pause, start) of playback.

Graphic 240 may also be displayed during playback of the voice annotation. Graphic 240 comprises a text transcription of the voice annotation. Embodiments are not limited to display of a text transcription, or to display of the text transcription in the manner shown in FIG. 2B.

As mentioned above, indicator 140 represents a voice annotation which is not associated with any virtual object. In some embodiments, the user may select indicator 140 to invoke a play control bar which may be used to control playback of the voice annotation.

Indicators 130 and 140 may comprise any perceptible graphical indicators, and need not be identical. In some embodiments, environment 110 does not include any graphical indicators representing voice annotations. Rather, selection of object 120 results in display of menu 210 including play control 220, thereby alerting the user to the existence of a voice annotation associated with object 120.

Figure 3:
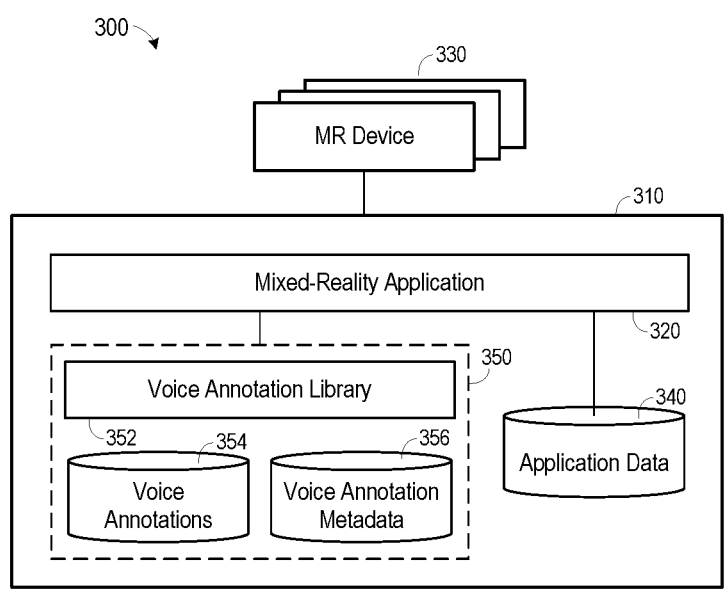
FIG. 3 is a block diagram of a system to provide voice annotations in a mixed-reality environment according to some embodiments.

FIG. 3 is a block diagram of system 300 to provide voice annotations in a mixed-reality environment according to some embodiments. Embodiments are not limited to system 300. Generally, computing system 310 executes mixed-reality application 320 to provide application functionality to one or more mixed-reality devices 340. Such functionality may utilize application data 340 stored by computing system 310. For example, mixed-reality application may comprise a layout application as described above, with various saved layouts including virtual objects being stored in application data 340.

Computing device 310 also includes voice annotation component 350 to support voice annotations as described herein. Voice annotation component 350 includes voice annotation library 352 of functions available to mixed-reality applications 320. The functions are executable to generate user interface controls related to generation and playback of a voice annotation, to store voice annotations and associated metadata in voice annotations 354 and voice annotation metadata 356, to identify voice annotations relevant to a mixed-reality environment and/or user based on voice annotation metadata 356, and to retrieve voice annotations from voice annotations 354 based on voice annotation metadata 356.

By virtue of system 300, a mixed-reality environment defined by data of application data 340 may be shared by two or more users, simultaneously or otherwise. Moreover, voice annotations generated by one user and stored in voice annotations 354 may be associated with mixed-reality environments and/or virtual objects via voice annotation metadata 356. These voice annotations may then be selectively retrieved from voice annotations 354 by other users based on voice annotation metadata 356.

Although a single mixed-reality application 320 is illustrated, computing system 310 may execute one or more other mixed-reality applications which independently access voice annotation component 350 to provide voice annotations as described herein. According to some embodiments, mixed-reality application 320 includes the above-described functions of voice annotation library 350, and application data 340 includes voice annotations 354 and voice annotation metadata 356. In some embodiments, each of mixed-reality devices 330 includes a portion (e.g., a client component) of mixed-reality application 320.

Figure 4:
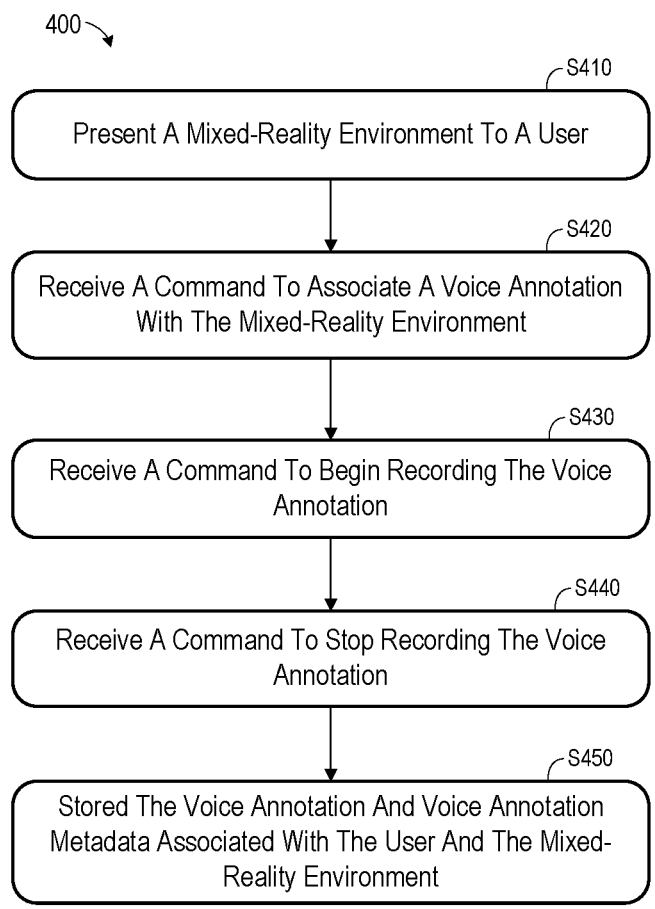
FIG. 4 is a flow diagram of a process to generate a voice annotation in a mixed-reality environment according to some embodiments.

FIG. 4 is a flow diagram of process 400 according to some embodiments. Process 400 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described below.

A mixed-reality environment is presented to a user at S410. The mixed-reality environment may be presented via execution of an application such as a videoconferencing, gaming, or other application providing audio recording and playback. The mixed-reality environment may include zero or more real objects and zero or more computer-generated images in the user's field of vision. The mixed-reality environment may be presented by a mixed-reality headset, a flat-panel display, or any suitable one or more systems.

Figure 5:
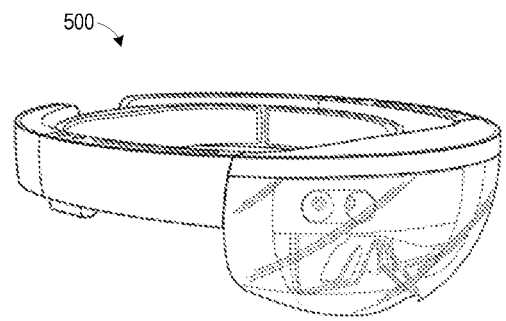
FIG. 5 depicts an audio/video device to generate and playback voice annotations in a mixed-reality environment according to some embodiments.

FIG. 5 is a view of head-mounted mixed-reality device 500 according to some embodiments. Embodiments are not limited to device 500.

Device 500 includes a speaker system for presenting spatialized sound and a display for presenting images to a wearer thereof. The images may completely occupy the wearer's field of view, or may be presented within the wearer's field of view such that the wearer may still view other objects in her vicinity. One or more of the presented images may be holographic.

Device 500 may also include sensors (e.g., cameras and accelerometers) for determining the position and motion of device 500 in three-dimensional space with six degrees of freedom. Data received from the sensors may assist in determining the size, position, orientation and visibility of the images displayed to a wearer. The sensors also include one or more microphones for capturing audio such as a voice annotation.

Figure 6:
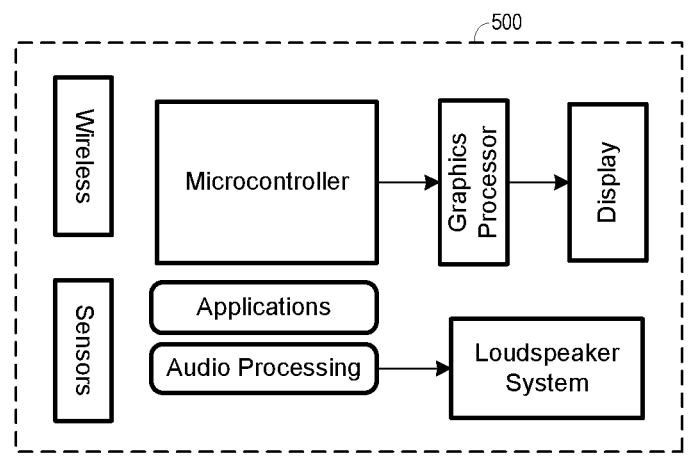
FIG. 6 is an internal block diagram of an audio/video device to generate and playback voice annotations in a mixed-reality environment according to some embodiments.

FIG. 6 is an internal block diagram of some components of device 500 according to some embodiments. Each component may be implemented using any combination of hardware and software. Device 500 is not limited to the illustrated components.

Device 500 includes a wireless networking component to receive and transmit data associated with an application executing on device 500 and/or on a computing system to which device 500 is wirelessly coupled. The data may include voice signals and graphics data, but embodiments are not limited thereto.

The sensors of device 500 may detect room acoustics and the position of objects within the room, as well as the position of device 500 within the room. The audio processing component of device 500 may utilize this information to process voice annotations prior to playback through the spatial loudspeaker system of device 500. Such processing may cause the wearer to perceive the sound of a voice annotation to be emanating from a virtual object with which the voice annotation is associated.

As shown in FIG. 6, device 500 may also include a graphics processor to assist in presenting images on its display. Such images may comprise mixed-reality images of virtual objects, graphical indications of voice annotations, voice annotation-related user interface controls, etc.

Returning to S410, the presented mixed-reality environment may comprise a previously-generated and saved layout of virtual objects. With reference to FIG. 3, S410 may comprise receiving a request from a mixed-reality device 330 to access a layout stored in application data 340, providing the stored layout to the mixed-reality device 330, and presenting the mixed-reality environment to the user via the mixed-reality device 330.

Figure 7A:
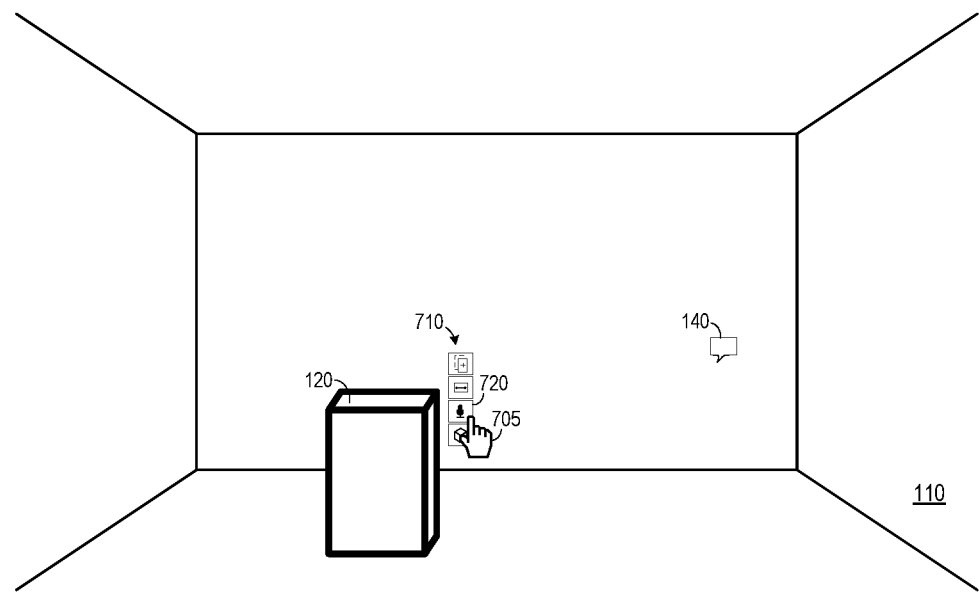
FIG. 7A depicts interaction with a mixed-reality environment to initiate recording of a voice annotation according to some embodiments.

At S420, a command is received to associate a voice annotation with the mixed-reality environment. FIG. 7A illustrates reception of a command with respect to previously-discussed environment 110 according to some embodiments. Prior to reception of the command, the user has manipulated cursor 705 to select virtual object 120 and invoke context menu 710.

Context menu 710 includes record control 720. As shown in FIG. 7A, the user manipulates cursor 705 to select annotation control 720. Selection of annotation control 720 comprises a command to associate a command with object 120, which is received at S420.

Figure 7B:
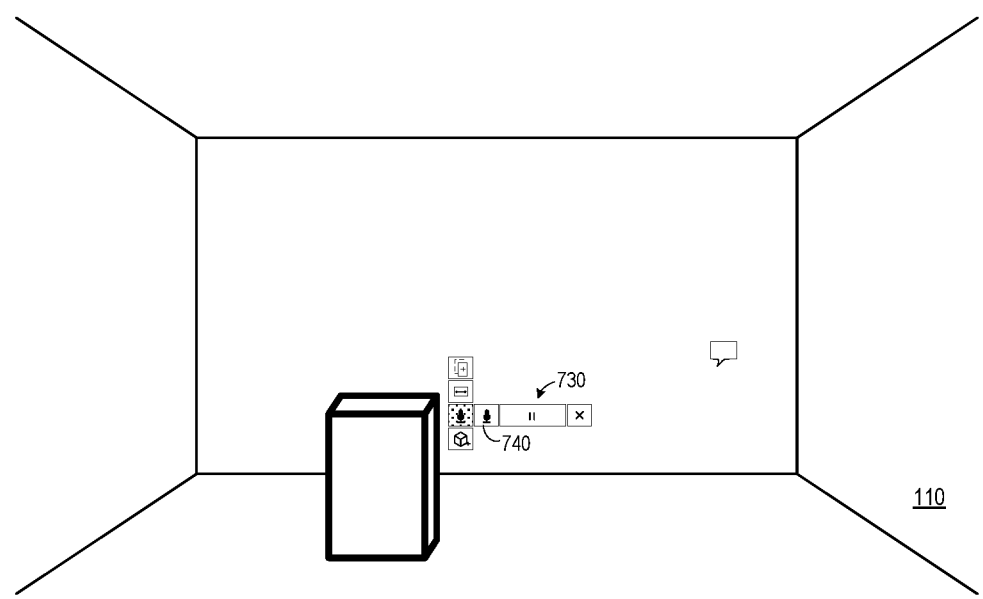
FIG. 7B depicts recording of a voice annotation in a mixed-reality environment according to some embodiments.

Next, at S430, a command to begin recording the voice annotation is received. Referring to the example of FIG. 7B, selection of annotation control 720 results in display of recording menu 730. Recording menu 730 includes record control 740. The user may select record control 740 to issue a command to begin recording. According to some embodiments, S420 and S430 comprise a single step, in that the command to associate a voice annotation with an object (e.g., selection of annotation control 720) is also a command to begin recording the voice annotation.

With respect to the FIG. 3 example, mixed-reality application 320 may receive the selection of object 120 and present context menu 710 in response. Upon user selection of record control 720, mixed-reality application 320 calls voice annotation library 352 of voice annotation component 350 to generate recording menu 730. Mixed-reality application 320 also uses voice annotation library 352 to initiate recording in response to the subsequent selection of record control 740.

The user then speaks to create audio signals comprising the voice annotation. The audio signals are captured by a recording device (e.g., a microphone) until a command is received to stop recording the voice annotation at S440. In some embodiments, a second selection of record control 740 comprises a command to stop recording. As described above, mixed-reality application 320 uses voice annotation library 352 to stop recording in response to the second selection of record control 740.

The captured audio signals of the voice annotation and associated voice annotation metadata are stored at S450. The voice annotation and voice annotation metadata are stored in association with the user and the mixed-reality environment. Returning to the FIG. 3 example, mixed-reality application 320 may call functions of voice annotation library 352 to store the voice annotation and voice annotation metadata in voice annotations 354 and voice annotation metadata 356, respectively.

FIG. 8 is a tabular representation of voice annotation metadata 800 according to some embodiments. Voice annotation metadata 800 may be stored across one or more database tables and according to any suitable schema. Voice annotation metadata according to some embodiments is not limited to the metadata entities of metadata 800 and does not necessarily include each metadata entity of metadata 800.

According to metadata 800, each voice annotation is associated with a unique ID, a Context value and a User value. The Context value may comprise an identifier of a mixed-reality application and of a particular environment (e.g., a saved layout) within the mixed-reality application. For example, the Context value associated with the voice annotation recorded in the scenario of FIGS. 7A and 7B may identify environment 110. The User value identifies the user who recorded the voice annotation.

Metadata 800 also associates an Object value and a Target value with each voice annotation. The Object value may identify one (or more) virtual objects. For example, the row associated with the voice annotation represented by indicator 130 may include an Object value identifying object 120. In some embodiments, the Object value may be a value (e.g., NULL) indicating that the voice annotation is generally associated with the context identified by the Context value and not with any particular object within the context. Such a voice annotation may be represented by indicator 140 of environment 100.

The Target value indicates one or more other users for whom the voice annotation is intended. In some embodiments, users other than the one or more users are not able to play back the voice annotation, even if these other users are able to access the context associated with the voice annotation. The recording user may specify such target users before, during or after the recording of the voice annotation. The Target value may be a value (e.g., NULL) indicating that any user accessing the context may play back the voice annotation.

The Reply IDs entity identifies one or more other voice annotations which were recorded as replies to the voice annotation identified by the ID entity. The Reply IDs entity may therefore allow determination of a list of voice annotations forming a conversation. The Reply IDs value may be empty in a case that no replies exist.

The Previous ID entity may support sequential voice annotations. For example, the Previous ID value may identify a voice annotation which must be played back by a user before the user is allowed to play back the voice annotation identified by the ID entity.

The Create Time entity indicates a time at which the voice annotation was recorded. Voice annotation metadata according to some embodiments may include other properties of voice annotations, including but not limited to length, loudness, and recording properties.

Figure 9:
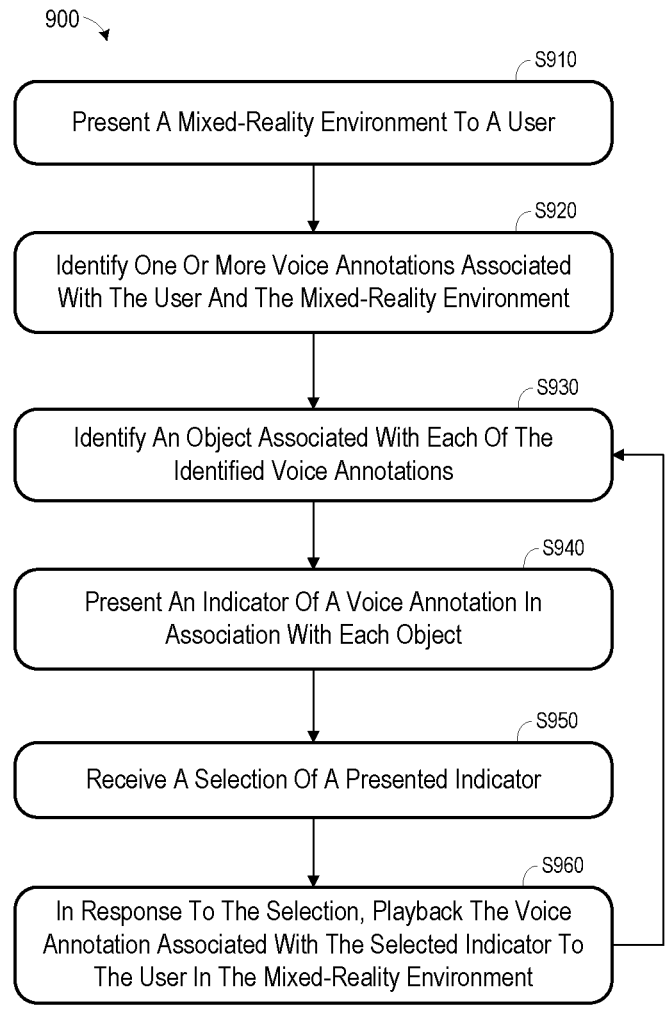
FIG. 9 is a flow diagram of a process to playback a voice annotation in a mixed-reality environment according to some embodiments.

FIG. 9 is a flow diagram of process 900 to play back a voice annotation according to some embodiments. A mixed-reality environment is presented to a user at S910. As described with respect to S410, S910 may comprise receiving a request from a mixed-reality device 330 to access a layout stored in application data 340, providing the stored layout to the mixed-reality device 330, and presenting the mixed-reality environment to the user via the mixed-reality device 330.

Next, at S920, one or more voice annotations are identified which are associated with the mixed-reality environment and the user. For example, mixed-reality application 320 may call a function of library 352 to identify the one or more voice annotations at S920. The called function accesses voice annotation metadata 356 to identify rows (i.e., voice annotation IDs) of metadata 800 which specify the current mixed-reality environment (via a corresponding Context value) and the current user (e.g., via a corresponding Target value).

An object associated with each identified voice annotation is identified at S930. The object may be identified based on stored metadata associated with its corresponding voice annotation. With respect to the example of FIG. 8, the object may be specified by the Object value of the row corresponding to the voice annotation.

An indicator of a voice annotation is presented in association with each object identified at S930. In some cases, an object may be associated with two or more voice annotations. S930 may therefore comprise presenting a separate indicator in association with the object for each of the two or more voice annotations. As mentioned above, one or more of the identified voice annotations may be associated with no object. Indicators for these voice annotations may be presented in any suitable location of the mixed-reality environment.

A selection of an indicator is received at S950. Such a selection may proceed as described with respect to FIGS. 2A and 2B. In response to the selection, an associated voice annotation is played back to the user in the mixed-reality environment at S960. The associated voice annotation may be retrieved from voice annotations 354 based on an identifier of the voice annotation determined from metadata 356. As described above, playback at S960 may be accompanied by a text transcription of the voice annotation.

Figure 10:
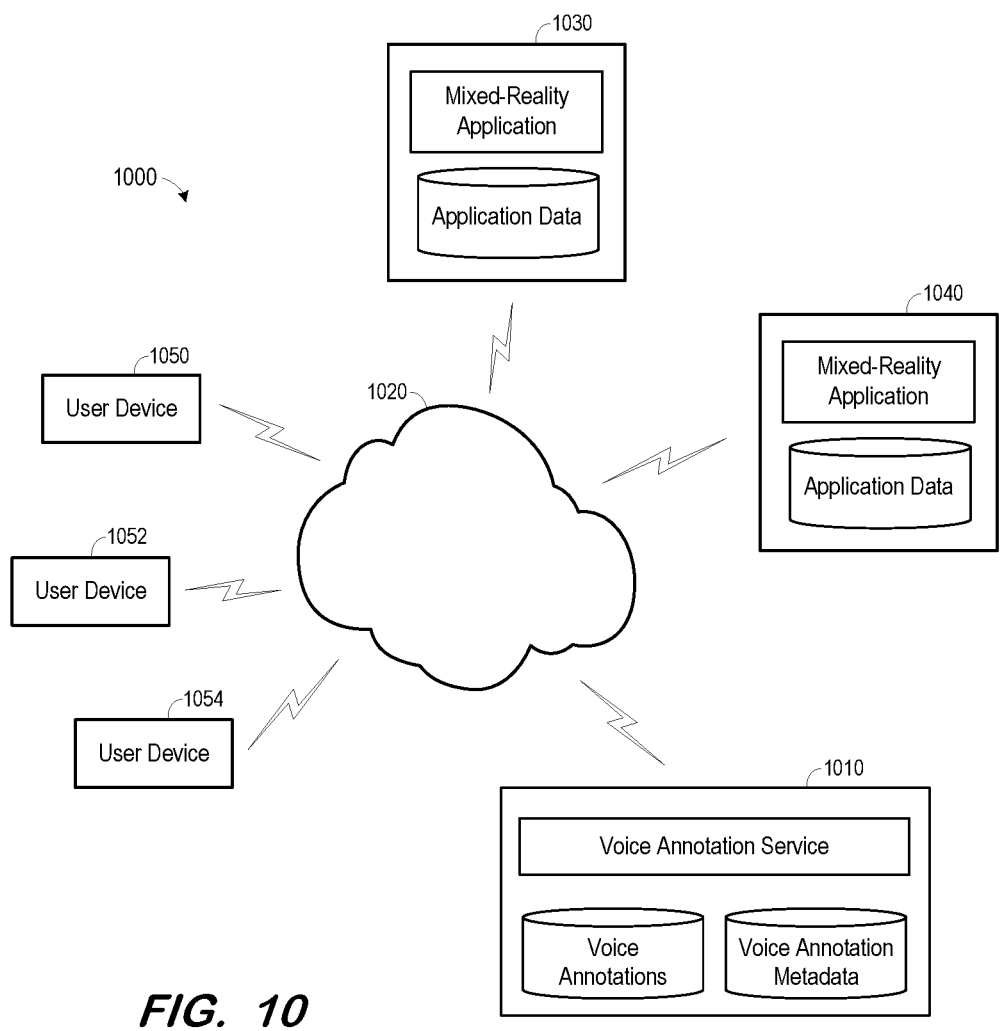
FIG. 10 is a block diagram of a cloud implementation of a voice annotation service according to some embodiments.

FIG. 10 illustrates distributed system 1000 according to some embodiments. System 1000 may be cloud-based and components thereof may be implemented using on-demand virtual machines, virtual servers and cloud storage instances.

As shown, voice annotation system 1010 may be implemented as a cloud service providing storage and retrieval of voice annotations. The voice annotation service may also provide voice annotation-related user interface controls as described above. Voice annotation system 1010 may provide services to mixed-reality applications executing on virtual servers 1030 and 1040. Virtual servers 1030 and 1040 may be accessed by user devices 1050, 1052 and 1054 to provide mixed-reality environments thereto.

User devices 1050, 1052 and 1054 may operate to generate voice annotations as described with respect to process 400 and to playback voice annotations as described with respect to process 900. In one example, a user operates device 1050 to access a mixed-reality application executing on virtual server 1030. In response to a request for a specific environment, the mixed-reality application identifies application data corresponding to the environment and calls voice annotation system 1010 to identify voice annotations associated with the environment (i.e., the context) and with the user. The mixed-reality application returns environment data and voice annotation data to user device 1050, which uses the data to present a mixed-reality environment to the user. The environment may or may not include graphical indicators of the identified voice annotations, depending on the implementation.

Device 1050 may request playback of voice annotations and/or recording of voice annotations as described above. Such requests are fulfilled by the mixed-reality application by accessing voice annotation system 1010 as described above.

According to some embodiments, user devices 1050, 1052 and 1054 may access voice annotation system 1010 directly. For example, voice annotation system 1010 may comprise a Web Server accessible by a Web browser to provide information regarding voice annotations and voice annotation metadata stored therein.

Figure 11:
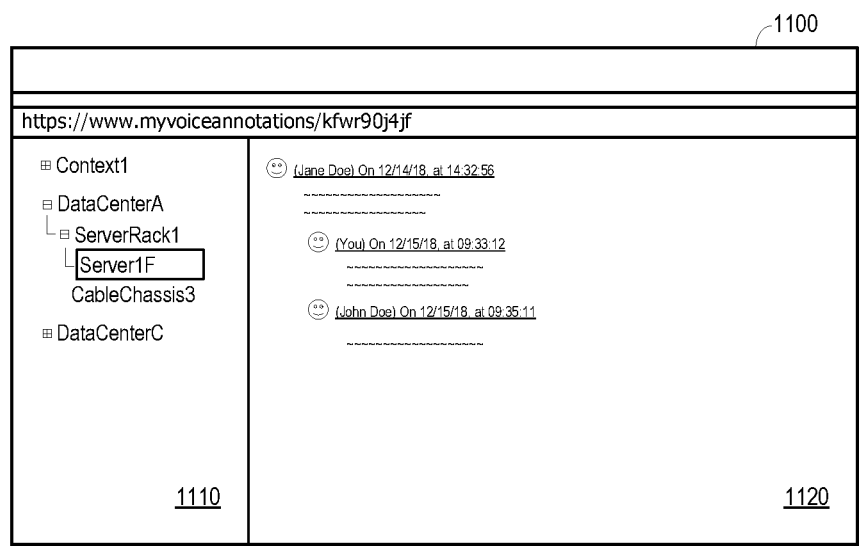
FIG. 11 illustrates a user interface to view and manage voice annotations according to some embodiments.

FIG. 11 illustrates interface 1100 presented on one of user devices 1050, 1052 and 1054 according to some embodiments. Interface 1100 may comprise a Web page or an interface of a client application associated with voice annotation system 1010. Interface 1100 includes context/object selection area 1110 and voice annotation area 1120. According to some embodiments, area 1110 displays one or more contexts (e.g., stored mixed-reality environments) for which associated voice annotations are stored in voice annotation system 1010. Each context may be associated with one or more virtual objects within that context which are in turn associated with one or more voice annotations. Area 1110 may be populated based on voice annotation metadata as described above.

Area 1120 presents voice annotations associated with the context/object selected in area 1110. In the present example, Server1F of DataCenterA is selected. Accordingly, the three voice annotations presented in area 1120 are associated (e.g., via voice annotation metadata) with Server1F of DataCenterA. As shown, presentation of a voice annotation includes presentation of a name of the user who recorded the voice annotation, a date and time of the recording, a transcription of the voice annotation, and a link which is selectable to download and play back the voice annotation. The voice annotations may be presented in any suitable manner, not limited to the depiction of FIG. 11.

Area 1120 of FIG. 11 presents three voice annotations. The last two voice annotations are replies to the first-listed voice annotation. Such a relationship may be specified within the voice annotation metadata associated with the voice annotations. For example, each voice annotation may be associated with a same context and virtual object (i.e., Server1F of DataCenterA), and metadata of the first voice annotation may indicate that the second and third voice annotations are replies to the first voice annotation (e.g., via the Reply IDs metadata entity).

Each functional component described herein may be implemented at least in part in computer hardware, in program code and/or in one or more computing systems executing such program code as is known in the art. Such a computing system may include one or more processing units which execute processor-executable program code stored in a memory system.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Those in the art will appreciate that various adaptations and modifications of the above-described embodiments can be configured without departing from the claims. Therefore, it is to be understood that the claims may be practiced other than as specifically described herein.

What is claimed is:

1. A computing system comprising:
   a storage system; and
   one or more processing units to execute processor-executable program code to cause the computing system to:
      transmit data of a mixed-reality environment including a plurality of virtual objects to a first user;
      receive, from the first user, a command to associate a voice annotation with the mixed-reality environment, one of the plurality of virtual objects and a second user;

receive audio signals of a voice annotation from the first user;

store the received audio signals in the storage system;

store metadata associating the received audio signals with the first user, the second user, the one of the plurality of virtual objects and the mixed-reality environment;

receive a request to present the mixed-reality environment to a user;

determine that the user is the second user;

in response to the determination that the user is the second user, and based on the metadata associating the received audio signals, the second user, the one of the plurality of virtual objects and the mixed-reality environment, present the mixed-reality environment including a visual indicator of the voice annotation to the user;

receive, from the user, a manipulation of the visual indicator in the mixed-reality environment; and in response to the manipulation, transmit the audio signals of the voice annotation to the user within the mixed-reality environment.

2. A computing system according to claim 1, the one or more processing units to execute processor-executable program code to cause the computing system to:

receive, from the first user, a second command to associate a second voice annotation with a second one of the plurality of virtual objects and a third user within the mixed-reality environment;

receive second audio signals of a second voice annotation from the first user; and store the received second audio signals in the storage system; and store second metadata associating the received second audio signals with the first user, the third user, the second one of the plurality of virtual objects and the mixed-reality environment.

3. A computing system according to claim 2, wherein storage of the second metadata comprises storage of metadata indicating that the second audio signals are to be played back after the audio signals.

4. A computing system according to claim 1, the one or more processing units to execute processor-executable program code to cause the computing system to:

receive, from the second user, a command to associate a second voice annotation with the first one of the plurality of virtual objects and the first user in the mixed-reality environment;

receive audio signals of a second voice annotation from the second user;

store the received audio signals of the second voice annotation in the storage system; and store metadata associating the received audio signals of the second voice annotation with the second user, the first user, the first one of the plurality of virtual objects and the mixed-reality environment.

5. A computing system according to claim 4, wherein storage of the metadata associating the received audio signals of the second voice annotation with the second user, the first user, the first one of the plurality of virtual objects and the mixed-reality environment comprises storage of metadata indicating that the second voice annotation is a reply to the voice annotation.

6. A method for a computing system configured to present mixed-reality environments, the method comprising:

presenting a mixed-reality environment including a plurality of virtual objects to a first user;

receiving, from the first user, a command to associate a voice annotation with one of the plurality of virtual objects and with a second user;

receiving audio signals of a voice annotation from the first user; storing the received audio signals in association with the first user, the second user and the one of the plurality of virtual objects;

receiving a request to present the mixed-reality environment to a user;

determining that the user is the second user;

in response to the determination that the user is the second user, and based on the association between the received audio signals, the second user, and the one of the plurality of virtual objects, presenting the mixed-reality environment including a visual indicator of the voice annotation to the user;

receiving, from the user, a manipulation of the visual indicator in the mixed-reality environment; and in response to the manipulation, transmitting the audio signals of the voice annotation to the user within the mixed-reality environment.

7. A method according to claim 6, further comprising:

receiving, from the first user, a command to associate a second voice annotation with a second one of the plurality of virtual objects and a third user;

receiving audio signals of a second voice annotation from the first user; and storing the received audio signals of the second voice annotation in association with the first user, the third user and the second one of the plurality of virtual objects.

8. A method according to claim 7, wherein storage of the second metadata comprises storage of metadata indicating that the second voice annotation is to be played back after the voice annotation.

9. A method according to claim 6, further comprising:

receiving, from the second user, a command to associate a second voice annotation with the one of the plurality of virtual objects and the first user in the mixed-reality environment;

receiving audio signals of the second voice annotation from the second user; and storing the received audio signals of the second voice annotation and metadata associating the received audio signals of the second voice annotation with the second user, the first user, the one of the plurality virtual objects and the mixed-reality environment.

10. A method according to claim 9, wherein storing the metadata associating the received audio signals of the second voice annotation with the second user, the first user, the one of the plurality virtual objects and the mixed-reality environment comprises storing metadata indicating that the second voice annotation is a reply to the voice annotation.

11. A computing system comprising a memory and a processing unit, the processing unit to execute processor-executable program code to cause the computing system to:

receive a request to present a mixed-reality environment including a plurality of virtual objects to a user;

identify stored metadata indicating an association between audio signals of a voice annotation received from a second user, the user, and one of the plurality of virtual objects, the metadata stored based on a command received from the second user to associate the voice annotation with the one of the plurality of virtual objects and with the user;

in response to the identification of the stored association, present the mixed-reality environment including the plurality of virtual objects and a visual indicator of the voice annotation to the user;

receive, from the user, a manipulation of the visual indicator in the mixed-reality environment; and in response to the manipulation, play back the audio signals of the voice annotation to the user within the mixed-reality environment.

12. A system according to claim 11, further to:

receive, from the user, a command to associate a second voice annotation with the one of the plurality of virtual objects and with the second user;

receive audio signals of a second voice annotation from the user; and transmit for storage the received audio signals of the second voice annotation and second metadata associating the received audio signals of the second voice annotation with the second user, the user and the one of the plurality of virtual objects.

13. A system according to claim 12, wherein storage of the second metadata comprises storage of third metadata indicating that the second voice annotation is to be played back after the first voice annotation.

* * * * *